June 24, 1924.
A. C. LILLIE
WIND DEFLECTOR
Filed Oct. 29, 1923
1,498,848
2 Sheets-Sheet 1
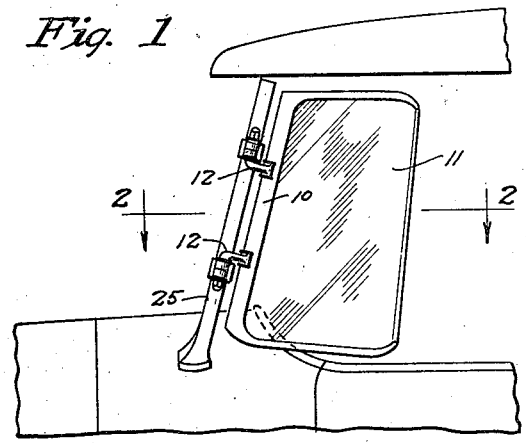
Fig. 1
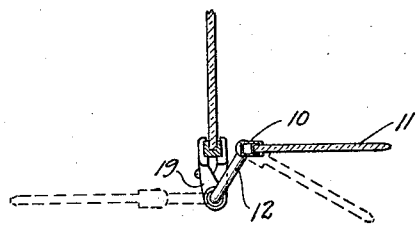
Fig. 2
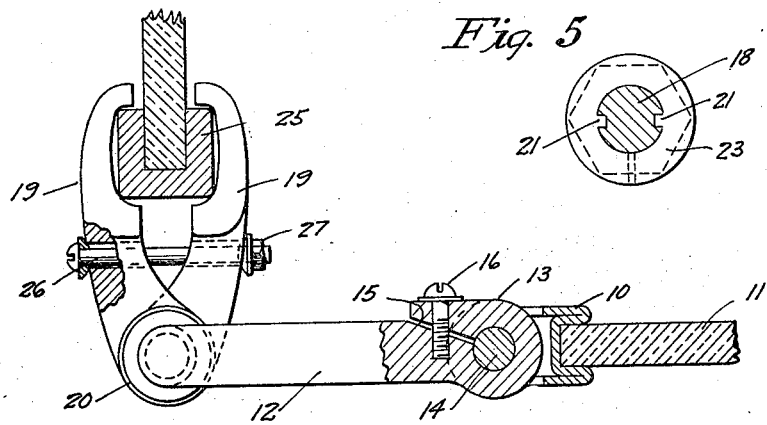
Fig. 3
Fig. 5
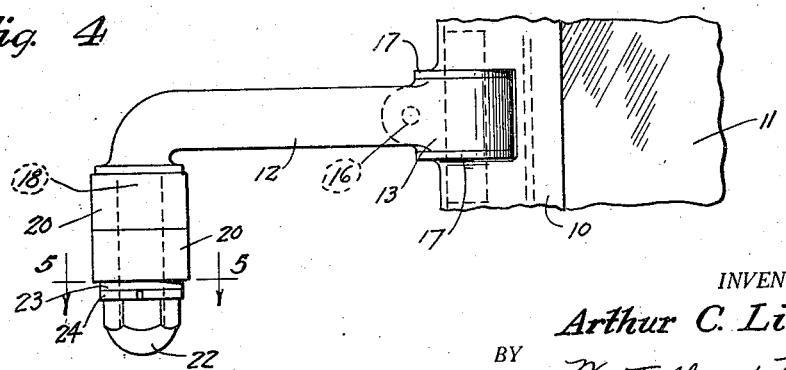
Fig. 4
INVENTOR.
Arthur C. Lillie
BY
Westall and Wallace
ATTORNEYS June 24, 1924.

A. C. LILLIE

WIND DEFLECTOR

Filed Oct. 29, 1923

1,498,848

2 Sheets-Sheet 2

INVENTOR.

Arthur C. Lillie

BY Westall and Wallace

ATTORNEYS

Patented June 24, 1924.

1,498,848

UNITED STATES PATENT OFFICE.

ARTHUR C. LILLIE, OF LOS ANGELES, CALIFORNIA.

WIND DEFLECTOR.

Application filed October 29, 1923. Serial No. 671,446.

*To all whom it may concern:*

Be it known that I, ARTHUR C. LILLIE, a citizen of the United States, and resident of Los Angeles, in the county of Los Angeles, State of California, have invented new and useful Improvements in a Wind Deflector, of which the following is a specification.

This invention relates to a windshield wing used in conjunction with the main windshield of an automobile. It is an object of this invention to provide a windshield wing or wind deflector which is ornamental, simple in structure, durable and economical to manufacture. Another object of this invention is to provide details of structure and an arrangement of parts whereby the wing may be readily and easily adjusted to a desired position and will be maintained in such adjusted position.

Figure 6:
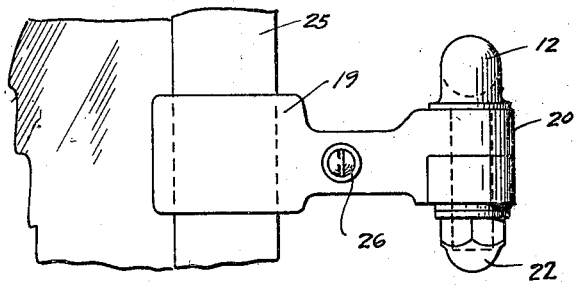
Figure 7:
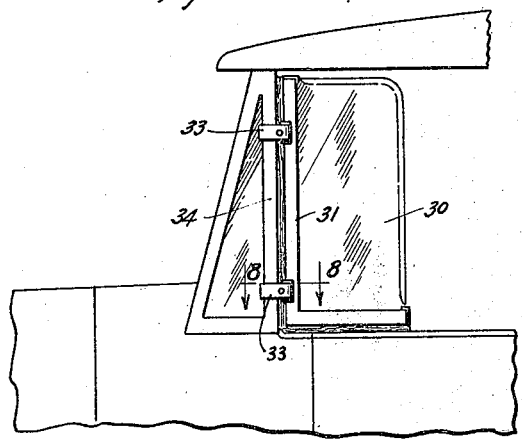

These objects together with other objects as will appear hereinafter are obtained by means of the embodiments of my invention illustrated in the accompanying drawing, in which:

Fig. 1 is a side elevation of a fragment of an automobile with my improved wing mounted thereon; Fig. 2 is a section as seen on the line 2—2 of Fig. 1, the dotted lines showing another position of the wing; Fig. 3 is a section on an enlarged scale showing the clamp; Fig. 4 is a side elevation of the structure shown in Fig. 3; Fig. 5 is a section as seen on the line 5—5 of Fig. 4; Fig. 6 is a front elevation of the structure shown in Figs. 3 and 4; Fig. 7 is a side elevation of a fragment of an automobile showing the mounting applied to an auxiliary shield; and Fig. 8 is a section on an enlarged scale as seen on the line 8—8 of Fig. 7.

Referring more particularly to Figs. 1 to 6, inclusive, a channel frame member indicated by 10 embraces three sides of a glass panel 11. The outer edge of the frame is cut away to receive the eyes of hinge arms 12. These hinge arms are similar in form and include eyes 13. Pintles 14 are fixed in the frame 10 and passed through the eyes 13. The eyes are split as indicated by 14, a screw 15 passing through the split portions whereby to adjust the frictional engagement of the bore of the eye against its pintle. In this construction, washers 17 are preferably mounted between the eyes and the frame. The structure is such that the panel or wing may be turned with relation to the arms 12. The joint between the arms and the wing are within the boundaries of the channel member of the frame making a compact structure. Each arm is bent downwardly and a pintle 18 formed thereon. A two part clamp having opposing jaws 19 with overlapping eyes 20 is mounted on each pintle 18. The end of the pintle is threaded and oppositely grooved as indicated by 21, see Fig. 5. A cap nut 22 is mounted on the pintle. Interposed between the nut 21 and the lower eye 20 is a washer indicated by 23 having tongues entering the grooves. A split lock washer 24 holds the nut against loosening. By tightening the nut 21 the friction between the pintles and eyes may be varied. By this structure the arms may be swung to adjusted position about the clamp. The jaws are so arranged that they be disposed on opposite sides of a windshield standard 25. A compression screw 26 extends through the jaws and is provided with a nut 27 at one end providing a structure such that the jaws may be drawn together so as to securely grip the standard.

Figure 8:
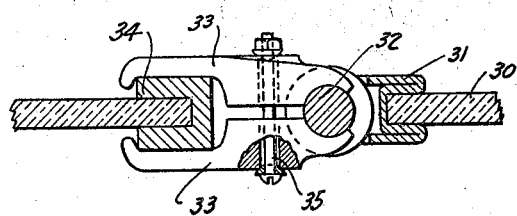

In Figs. 7 and 8, a wing is shown comprising a panel of glass indicated by 30 embraced on two of its sides by the channel frame 31. Within the border of the frame are pintles, one of which is indicated by 32. This structure is the same as that shown in Figs. 1 to 6 inclusive, except for the shape of the frame for the panel. Embracing the pintles is a split bearing comprising jaws 33, the other ends of the jaws act as a clamp engaging the frame 34. A clamping screw 35 serves to draw the jaws together so as to securely hold the latter upon the frame 34 and to frictionally grip the pintle in the wing, whereby the latter may be adjusted to any desired angle and held in this position.

The pintles being within the boundaries of the frame of the wing provides a compact, durable structure.

What I claim is:

1. A windshield wing comprising a transparent panel, a channel frame embracing said panel, a pintle fixed to said frame and wholly disposed within the boundaries of the channel, an arm adapted to be secured to the vehicle and being frictionally secured to said pintle whereby the wing may be pivotally adjusted.

2. A windshield wing comprising a transparent panel, a channel frame embracing said panel, said channel frame being cut away, a pintle disposed within said cut away portion within the boundaries of the channel and fixed to said frame, an arm adapted to be secured to the vehicle at one end and being frictionally secured to said pintle whereby the latter may be pivotally adjusted.

3. A windshield wing comprising a transparent panel, a channel frame embracing said panel, said frame being cut away, a pintle disposed within said cut away portion within the boundaries of the channel and fixed to said frame, an arm adapted to be secured to the vehicle and having an eye in which said pintle is frictionally secured whereby the latter may be pivotally adjusted.

4. A windshield wing comprising a transparent panel, a channel frame embracing said panel, a pintle fixed to said frame and disposed within the boundaries of the channel, an arm frictionally secured to said pintle whereby the latter may be pivotally adjusted thereabout, and a support pivotally secured to said adjustment arm whereby the latter may be attached to a vehicle.

5. A windshield wing comprising a transparent panel, a channel frame embracing said panel and having a portion cut away, a pintle fixed to said frame and disposed within the boundary of the channel at the cut away portion, an arm having an eye in which said pintle is frictionally secured, and a supporting arm pivotally secured to said arm whereby the latter may be pivotally adjusted.

In witness that I claim the foregoing I have hereunto subscribed my name this 19th day of October, 1923.

ARTHUR C. LILLIE.